(12) United States Patent
Pang et al.

(10) Patent No.: US 9,376,962 B2
(45) Date of Patent: Jun. 28, 2016

(54) FUEL GAS HEATING WITH THERMAL ENERGY STORAGE

(71) Applicant: General Electric Company, Schenectady, NY (US)

(72) Inventors: Raymond Pang, Schenectady, NY (US); Kamlesh Mundra, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 13/715,540

(22) Filed: Dec. 14, 2012

(65) Prior Publication Data

US 2014/0165572 A1 Jun. 19, 2014

(51) Int. Cl.
*F01K 23/10* (2006.01)
*F02C 7/224* (2006.01)
*F01K 17/02* (2006.01)

(52) U.S. Cl.
CPC .............. *F02C 7/224* (2013.01); *F01K 17/025* (2013.01); *F01K 23/10* (2013.01); *Y02E 20/16* (2013.01)

(58) Field of Classification Search
CPC ....... F01K 23/10; F01K 17/025; Y02E 20/16; F02C 7/224
USPC .................................. 60/641.8; 137/625.35
See application file for complete search history.

(56) References Cited

U.S. PATENT DOCUMENTS

| | | |
|---|---|---|
| 3,848,416 A | 11/1974 | Bundy |
| 4,089,744 A | 5/1978 | Cahn |
| 4,094,148 A | 6/1978 | Nelson |
| 4,291,537 A | 9/1981 | Oplatka |
| 4,353,207 A * | 10/1982 | Lee ............. B01D 53/8631 122/7 B |
| 4,438,630 A | 3/1984 | Rowe |
| 4,549,401 A | 10/1985 | Spliethoff |
| 4,806,136 A | 2/1989 | Kiersz et al. |
| 5,727,379 A | 3/1998 | Cohn |
| 5,865,023 A | 2/1999 | Sorensen et al. |
| 6,173,563 B1 | 1/2001 | Vakil et al. |
| 6,220,013 B1 | 4/2001 | Smith |
| 6,226,976 B1 | 5/2001 | Scott et al. |
| 6,321,539 B1 * | 11/2001 | Bronicki ............. F01K 23/067 60/641.8 |

(Continued)

FOREIGN PATENT DOCUMENTS

| | | |
|---|---|---|
| EP | 2722496 A2 | 4/2014 |
| WO | 2007093464 A1 | 8/2007 |

(Continued)

OTHER PUBLICATIONS

Great Britain Intellectual Property Office, Search Report under Section 17 for Application No. GB1321525.6 dated Jul. 30, 2014, 4 pages.

(Continued)

*Primary Examiner* — William H Rodriguez
*Assistant Examiner* — Eric Linderman
(74) *Attorney, Agent, or Firm* — Ernest G. Cusick; Hoffman Warnick LLC

(57) ABSTRACT

Thermal energy storage containing thermal energy extracted from a bottom cycle heat engine is leveraged to heat fuel gas supplied to a gas turbine engine operating in a top cycle heat engine. Further, an extracted portion of a working fluid generated in a steam generation source of the bottom cycle heat engine can be used along with the thermal energy storage to heat fuel gas.

20 Claims, 4 Drawing Sheets

(56) References Cited

U.S. PATENT DOCUMENTS

| | | | | |
|---|---|---|---|---|
| 6,364,602 | B1* | 4/2002 | Andrew | F01D 21/10 415/1 |
| 6,442,924 | B1* | 9/2002 | Talley | F01K 23/103 60/39.182 |
| 6,996,988 | B1* | 2/2006 | Bussard | F01K 3/12 60/641.15 |
| 7,171,812 | B2* | 2/2007 | Schubert | F03G 6/00 60/641.15 |
| 7,611,676 | B2 | 11/2009 | Inage et al. | |
| 7,726,127 | B2* | 6/2010 | Litwin | C01B 3/08 60/641.11 |
| 7,954,321 | B2* | 6/2011 | Shinnar | F03G 6/04 165/902 |
| 8,075,646 | B2 | 12/2011 | Briesch et al. | |
| 8,387,356 | B2* | 3/2013 | Yang | F01K 7/24 60/39.182 |
| 8,484,973 | B2* | 7/2013 | Gathmann | F03G 6/005 126/617 |
| 8,567,196 | B2* | 10/2013 | Okita | F01K 7/18 60/641.8 |
| 8,661,777 | B2* | 3/2014 | Zohar | F03G 6/067 60/39.182 |
| 8,701,411 | B2 | 4/2014 | Koketsu et al. | |
| 8,904,793 | B2 | 12/2014 | Hemrle et al. | |
| 8,925,543 | B2* | 1/2015 | Zillmer | F16L 9/18 126/609 |
| 9,038,387 | B2* | 5/2015 | Kaufmann | F02C 1/05 60/641.11 |
| 9,038,390 | B1* | 5/2015 | Kreuger | F01K 23/02 60/655 |
| 2003/0182944 | A1 | 10/2003 | Hoffman et al. | |
| 2005/0279095 | A1 | 12/2005 | Goldman | |
| 2007/0017207 | A1* | 1/2007 | Smith | F01K 21/047 60/39.182 |
| 2007/0095068 | A1 | 5/2007 | Joshi et al. | |
| 2008/0000231 | A1* | 1/2008 | Litwin | F03G 6/06 60/641.11 |
| 2008/0127647 | A1* | 6/2008 | Leitner | F02C 1/007 60/645 |
| 2008/0233527 | A1 | 9/2008 | Heinrich et al. | |
| 2009/0120088 | A1* | 5/2009 | Chillar | F02C 3/34 60/605.2 |
| 2009/0121495 | A1 | 5/2009 | Mills | |
| 2010/0031624 | A1 | 2/2010 | Austin et al. | |
| 2010/0031625 | A1 | 2/2010 | Narayan et al. | |
| 2010/0175687 | A1* | 7/2010 | Zillmer | F16L 9/18 126/619 |
| 2010/0251712 | A1* | 10/2010 | Nakhamkin | F01K 3/12 60/659 |
| 2010/0288571 | A1 | 11/2010 | Dewis et al. | |
| 2010/0295306 | A1 | 11/2010 | Ridnik et al. | |
| 2010/0319359 | A1 | 12/2010 | Holt et al. | |
| 2011/0085917 | A1* | 4/2011 | Ward | F04D 13/16 417/36 |
| 2011/0100611 | A1* | 5/2011 | Ohler | F01K 3/00 165/104.28 |
| 2011/0162368 | A1* | 7/2011 | Schroder | F01K 3/12 60/670 |
| 2011/0271953 | A1 | 11/2011 | Wortmann et al. | |
| 2011/0277469 | A1* | 11/2011 | Brenmiller | F03G 6/067 60/641.8 |
| 2011/0283700 | A1 | 11/2011 | Zohar et al. | |
| 2012/0055157 | A1 | 3/2012 | Gulen et al. | |
| 2012/0240549 | A1* | 9/2012 | Pang | F01K 13/02 60/39.182 |
| 2013/0000272 | A1* | 1/2013 | Gulen | F02C 6/18 60/39.182 |
| 2013/0042621 | A1 | 2/2013 | Carroni et al. | |
| 2013/0098313 | A1* | 4/2013 | Pang | F22G 5/04 122/460 |
| 2014/0033676 | A1* | 2/2014 | Pang | F03G 6/00 60/39.182 |
| 2014/0102073 | A1* | 4/2014 | Pang | F01K 3/00 60/39.182 |
| 2014/0165572 | A1 | 6/2014 | Pang et al. | |
| 2014/0223906 | A1* | 8/2014 | Gee | F03G 6/064 60/641.15 |
| 2015/0000248 | A1* | 1/2015 | del Omo | F01K 3/00 60/39.182 |
| 2015/0260463 | A1* | 9/2015 | Laughlin | F02C 1/10 165/10 |

FOREIGN PATENT DOCUMENTS

| | | |
|---|---|---|
| WO | 2007093474 A1 | 8/2007 |
| WO | 2009106657 A1 | 9/2009 |
| WO | 2010032238 A2 | 3/2010 |
| WO | 2011068880 A2 | 6/2011 |
| WO | 2012159924 A1 | 11/2012 |

OTHER PUBLICATIONS

Linderman, Non-final Office Action for U.S. Appl. No. 13/653,507, dated Jun. 30, 2015, 30 pages.

Linderman, Non-final Office Action for U.S. Appl. No. 13/653,507, dated Oct. 22, 2015, 30 pages.

Linderman, Notice of Allowance and Fee(s) Due for U.S. Appl. No. 13/653,507, dated Mar. 1, 2016, 17 pages.

* cited by examiner

FUEL GAS HEATING WITH THERMAL ENERGY STORAGE

BACKGROUND OF THE INVENTION

The present invention relates generally to fuel gas heating, and more particularly, to leveraging a thermal energy storage unit to heat fuel gas supplied to a gas turbine engine.

During operation, a gas turbine engine combusts a mixture of fuel gas and air to generate hot combustion gases which drive rotation of one or more stages of turbine blades. The rotation may be used to drive a load such as an electrical generator. Typically, when a gas turbine engine initially starts up, the fuel gas and air are mixed directly in the combustor chamber of the gas turbine engine. Eventually, as the load ramps up, the gas turbine engine will operate in a pre-mix combustion mode in which the fuel gas and air are mixed upstream of the combustor chamber. Harmful emissions containing mono-nitrogen oxides ($NO_x$) are generally much higher during the initial startup of the gas turbine engine and will improve dramatically once a pre-mix combustion mode is initiated. Consequently, it is desirable to rapidly bring the gas turbine engine to a load level that operates in a pre-mix combustion mode in order to reach an $NO_x$ emissions level that is in compliance with pertinent regulations. The faster the gas turbine engine reaches a so-called "emissions-compliant" load level, the smaller is the total amount of harmful emissions.

The rate of loading of a gas turbine engine is generally dependent on a stable operation of the combustor chamber. The stable operation of the combustor chamber is primarily controlled by the fuel gas temperature. In particular, during startup, the gas turbine engine will cycle through several combustion modes before initiating a pre-mix combustion mode. These combustion modes including the pre-mix combustion mode each require a certain minimum fuel gas temperature at the inlet of the combustor chamber before it can sequence through the next mode.

Fuel gas heating systems are typically utilized during the startup of a gas turbine engine in order for it to more quickly meet fuel gas temperature requirements that are necessary for operating at a low-emissions operating load. One example of a fuel gas heating system includes using hot water generated from within other components used in a power plant in which the gas turbine engine operates in order to heat the fuel gas. The use of such a fuel gas heating system is limited by the ability of these power plant components to generate hot water in a timely and efficient manner. For example, during a power plant startup after a sufficiently long down time, it may take a significant amount of time before one of these power plant components can actually provide hot water at the temperatures needed for fuel gas heating to attain required temperature levels. In this instance, the gas turbine engine will have to idle at some part-load condition as the component warms up enough to provide the hot water temperatures that will enable sufficient fuel gas heating. Other examples of fuel gas heating systems include using auxiliary systems such as electric heating or an auxiliary boiler to heat the fuel gas. These types of fuel gas heating systems are typically expensive to deploy.

BRIEF DESCRIPTION OF THE INVENTION

In one aspect of the present invention, a system is provided. In this aspect of the present invention, the system comprises a gas turbine engine and a steam generating source configured to recover exhaust energy from the gas turbine and generate a supply of a working fluid. The system further includes a thermal storage unit having a cold tank containing a thermal storage working medium in a cold state and a hot tank containing the thermal storage working medium in a heated state. A fuel gas source is configured to supply fuel gas to the gas turbine engine. A first fuel gas heater is configured to heat the fuel gas supplied from the fuel gas source. A second fuel gas heater is configured to complement the first fuel gas heater in the heating of the fuel gas supplied from the fuel gas source. In particular, the first fuel gas heater and the second fuel gas heater utilize an extracted portion of the working fluid generated in the steam generating source and thermal energy from the thermal storage working medium stored in the hot tank of the thermal storage unit to heat the fuel gas to a predetermined fuel gas temperature level.

DETAILED DESCRIPTION OF THE INVENTION

Figure 1:
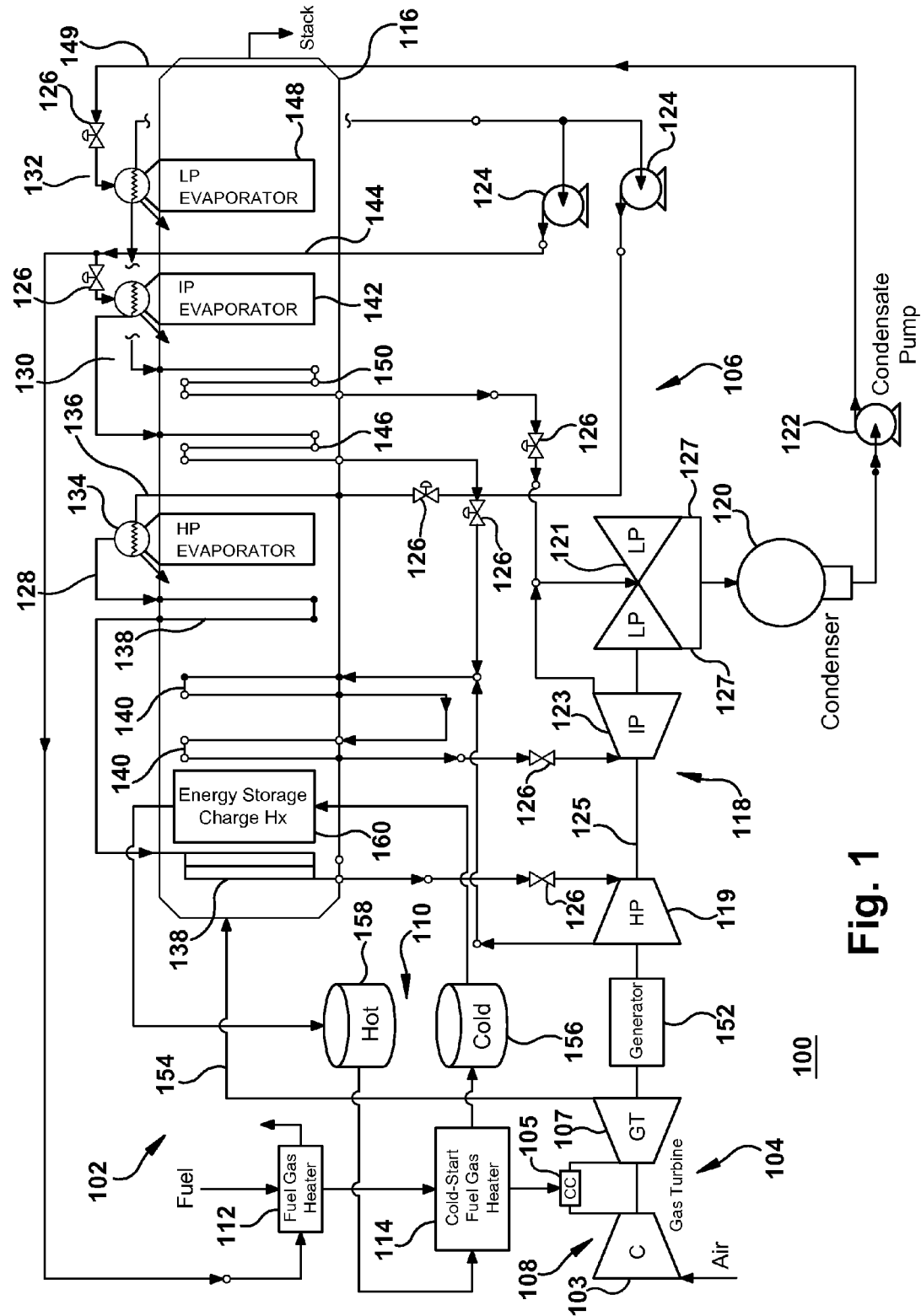
FIG. 1 is a schematic diagram of an electrical power generation plant having a fuel gas heating system according to a first embodiment of the present invention.

Various embodiments of the present invention are directed to utilizing a thermal storage unit to heat fuel gas for use in an electrical power generation plant such as, for example, a combined-cycle power plant having a top cycle heat engine operating with a topping thermodynamic cycle and a bottom cycle heat engine operating with a bottoming thermodynamic cycle. The thermal storage unit can contain a thermal storage working medium that may include thermal energy extracted from the bottom cycle heat engine. The thermal energy can be stored in a medium such an inorganic salt (e.g., molten salt), hot oil, pressurized water, etc. The thermal storage unit may include a cold tank containing the thermal storage working medium in a cold state and a hot tank containing the thermal storage working medium in a heated state. In addition to utilizing the thermal storage unit, the various embodiments of the present invention can leverage an extracted portion of a working fluid generated in the bottom cycle heat engine such as, for example, in a steam generation source (e.g., a heating recovery steam generation (HRSG) unit), to heat the fuel gas.

The fuel gas heating system of the various embodiments of the present invention can further include a first fuel gas heater that can heat fuel gas supplied from a fuel gas source to a gas turbine engine that is associated with the top cycle heat engine. In addition, a second fuel gas heater can be used to complement the first fuel gas heater in the heating of the fuel gas supplied from the fuel gas source to the gas turbine engine. In particular, the second fuel gas heater can utilize the thermal energy from the thermal storage working medium stored in the hot tank of the thermal storage unit to facilitate heating of the fuel gas to a predetermined fuel gas temperature level by the first fuel gas heater and the second fuel gas heater. In various embodiments of the present invention, the first fuel gas heater and the second fuel gas heater can leverage the extracted portion of the working fluid generated in the bottom cycle heat engine in concert with the thermal storage working medium to provide various fuel gas heating configurations described below in more detail.

These configurations enable a more rapid heating of the fuel gas as opposed to previous approaches that have been used for heating fuel gas. Heating up fuel gas more quickly enables a gas turbine engine to begin operating sooner in the startup sequence in a pre-mix combustion mode. This means that the gas turbine engine can reach a higher, "emissions-compliant" load level more quickly since $NO_x$ emissions are dramatically less when the fuel gas and air are mixed upstream of the combustor chamber as opposed to being mixed directly in the combustor during the initial startup where $NO_x$ emissions are at a much higher level. As a result, the various embodiments of the present invention have particular utility during the startup of a gas turbine engine.

The various embodiments of the present invention enable a gas turbine engine to reach predetermined fuel gas requirements that are generally necessary to operate in a pre-mix combustion mode sooner in the startup sequence, regardless of whether it is a "cold" startup or a "warm" startup. This enables power plant operators to reduce emissions on gas turbine engine startups, which typically contributes significantly to the total emissions of a typical power plant. These technical effects are illustrative of some of the aspects associated with the various embodiments of the present invention and are not intended to be restrictive. These technical effects and others associated with the embodiments of the present invention are described below in more detail.

Referring now to the figures, FIG. 1 shows a schematic diagram of an electrical power generation plant 100 having a fuel gas heating system 102 according to a first embodiment of the present invention. The electrical power generation plant 100 illustrated in FIG. 1 is a combined-cycle power plant that includes a top cycle heat engine 104 operating with a topping thermodynamic cycle that is configured to generate electric energy and a bottom cycle heat engine 106 operating with a bottoming thermodynamic cycle that is configured to generate additional electric energy. Although the description that follows pertains to a combined-cycle power plant, those skilled in the art will appreciate that the various embodiments of the present invention may be suitable for any type of power plant that utilizes a gas turbine engine such as, for example, a simple-cycle power plant.

As shown in FIG. 1, top cycle heat engine 104 includes a gas turbine engine 108 including a compressor section (C) 103, a combustor chamber section (CC) 105 and a gas turbine section (GT) 107. Those skilled in the art will appreciate that gas turbine engine 108 is only one example of a gas turbine engine configuration that can be employed with a combined-cycle power plant and is not intended to limit the various embodiments of the present invention described herein. As used herein, top cycle heat engine 104 generally refers to gas turbine engine 108 including the compressor section 103, combustor chamber section 105 and gas turbine section 107 as the primary components, however, other components of the top cycle heat engine not illustrated in FIG. 1 may include a gas fuel skid and flow control valves, variable actuating inlet guide vanes, an exhaust diffusor, a compressor inlet housing with a cooling system, etc.

Bottom cycle heat engine 106 refers to all components in FIG. 1 that are not associated with gas turbine engine 108, excluding a thermal storage unit 110, generator 152, a fuel gas heater 112 and a cold-start fuel gas heater 114, which are part of fuel gas heating system 102. That is, bottom cycle heat engine 106 may include an HRSG 116 and all of its components some of which are described below in more detail, a steam turbine engine 118, a condenser 120, a condensate pump 122, boiler feeder pumps 124 connecting a water supply from a low pressure evaporator to higher pressure-level sections of HRSG 116, various valves 126 controlling the flow of working fluids, and piping (e.g., conduits) that distributes the fluids to and from HRSG 116. In addition, bottom cycle heat engine 106 can include other components not specifically shown such as the balance of electrical power generation plant 100 and associated auxiliary equipment.

Continuing with the description of bottom cycle heat engine 106, HRSG 116 uses exhaust energy from the gas turbine section 107 of gas turbine engine 108 to generate a source of working fluid supplied to steam turbine engine 118 via piping and valves 126. In particular, HRSG 116 supplies the steam to drive the turbine sections of steam turbine engine 118. HRSG 116 is only one example of a steam generation source that can be used to generate a working fluid of water/steam for expansion in steam turbine engine 118 and those skilled in the art will appreciate that other steam generation sources exist including HRSGs that generate steam at two or three pressure levels, and with or without reheat superheater sections.

As shown in FIG. 1, HRSG 116 is a multi-pressure section HRSG that includes a high pressure section 128, an intermediate pressure section 130, and a low pressure section 132. High pressure section 128 includes a high pressure (HP) evaporator 134, an HP economizer 136, and HP superheaters 138 Intermediate pressure section 130 includes an intermediate pressure (IP) evaporator 142, an IP economizer 144, an IP superheater 146, and intermediate pressure reheaters 140. Low pressure section 132 includes a low pressure (LP) evaporator 148, an LP economizer 149, and an LP superheater 150. Those skilled in the art will appreciate that this is one example of an HRSG that can be used with fuel heating system 102 and is not meant to limit the scope of the various embodiments described herein. Other HRSG configurations with multiple pressure sections and multiple heat exchanges are suitable for use with the various embodiments of the present invention. Furthermore, those skilled in the art will appreciate that the number of superheaters shown in HP section 128, IP section 130 and LP section 132 can include more or less superheaters than what is illustrated in FIG. 1. Similarly, IP section 130 may have more or less reheaters 140 than what is illustrated in FIG. 1. Furthermore, those skilled in the art will appreciate that for clarity, HRSG 116 is shown in FIG. 1 with the components that illustrate the various embodiments of the present invention and that there would be other components than what is shown in this figure.

In FIG. 1, steam turbine engine 118 includes an HP turbine section 119, an LP turbine section 121 and an IP turbine section 123, which is located between the HP turbine section and the LP turbine section. A common shaft 125 couples HP turbine section 119, LP turbine section 121 and IP turbine section 123 to drive an electrical generator 152 that is also coupled to the shaft. Although HP turbine section 119, LP turbine section 121 and IP turbine section 123 are illustrated in FIG. 1 as being coupled to each other and to electrical generator 152 by shaft 125, those skilled in the art will appreciate that other coupling and shaft line arrangements may be used.

In one embodiment, as shown in FIG. 1, LP turbine section 121 may include two LP turbine sections each having a steam conduit 127 that supplies steam exhausted from LP turbine sections 121 to condenser 120 which can condense the steam exhausted from the LP turbine sections and recycle the condensate back to HRSG 116 via condensate pump 122. Those skilled in the art will appreciate that the LP turbine section can be configured in other implementations and is not meant to limit the scope of the various embodiments of the present invention described herein. For example, the LP turbine section could include a single flow LP section, one double flow LP section, two or more double flow LP sections, and any combination of single flow and double flow LP sections.

Those skilled in the art will appreciate that steam turbine engine 118 as illustrated in electrical power generation plant 100 is only one example of a steam turbine configuration in which the various embodiments of the present embodiment can operate and is not intended to be limiting.

Furthermore, those skilled in the art will appreciate that top cycle heat engine 104 and bottom cycle heat engine 106 in electrical power generation plant 100 can have other components than that shown in FIG. 1. For example, gas turbine engine 108 and steam turbine engine 118 can have controllers that control the operation of the turbines (e.g., speed and load). In addition to controlling the speed and load of the turbine engines, the controllers can perform other functions. For example, a controller for steam turbine engine 118 could regulate the supply of the steam from through HP turbine section 119, IP turbine section 123, and LP turbine section 121 via steam valves 126.

Top cycle heat engine 104 and bottom cycle heat engine 106 can operate in the following manner. Exhaust from gas turbine section 107 is supplied to HRSG 116 via an exhaust conduit 154. In addition, a working fluid from LP evaporator 148 is fed into IP economizer 144 and HP economizer 136 via boiler feed pumps 124 for preheating. Although two boiler feed pumps 124 are illustrated as feeding the working fluid from the boiler into IP economizer 144 and HP economizer 136, those skilled in the art will appreciate that other configurations that perform the same function can be used. For example, the two boiler feed pumps can be incorporated into one feed pump having two extraction points each supplying the working fluid to one of the IP economizer 144 and HP economizer 136.

After IP economizer 144 and HP economizer 136 preheat the working fluid at their respective pressure settings, the fluid is supplied to IP evaporator 142 and HP evaporator 134, respectively, where it is evaporated or vaporized into a steam at pressure settings that are considered high pressure (e.g., from about 1500 PSI to about 2400 PSI) and intermediate pressure (e.g., from about 300 PSI to about 550 PSI). The working fluid from HP evaporator 134 is heated to a significantly higher temperature in HP superheaters 138. HP superheaters 138 supply the steam at a high pressure to HP section 119 of steam turbine engine 118. Exhaust from HP section 119 of steam turbine engine 118 merges with steam generated from IP superheater 146. This mixture is reheated to a higher temperature by reheaters 140. Reheaters 140 then supply this steam to IP section 123 of steam turbine engine 118 for expansion. Exhaust from IP section 123 of steam turbine engine 118 is merged with steam provided from LP superheater 150 and supplied to LP section 121 of the steam turbine engine for expansion. Condenser 120 condenses the expanded working fluid from LP section 121 of the steam turbine engine 118 to produce a liquid (condensate) that is fed back into HRSG 116 by condensate pump 122. In particular, condensate pump 122 supplies the condensate to LP economizer 149 which preheats the condensate at a low pressure (e.g., from about 60 PSI to about 100 PSI) and provides it to LP evaporator 148. By-products from HRSG 116 can be released into the atmosphere via a stack.

In this manner, gas turbine engine 104 and steam turbine engine 118 can drive generator 152. Generator 152 can generate electric power and produce electricity for distribution to an electricity supply grid. Although FIG. 1 shows gas turbine engine 104 and steam turbine engine 118 on a common single shaft and both contributing power to a single generator connected to this shaft, those skilled in the art will appreciate other coupling and shaft line arrangements are within the scope of the various embodiments of the present invention. For example, a multi-shaft configuration could be utilized where the gas turbine engine and the steam turbine engine are on separate shafts with each driving its own generator. Also, multi-shaft plant configurations are within the scope of the various embodiments of the present invention. For example, two gas turbine engines could be used to produce steam for one steam turbine engine. Other non-exhaustive examples could include three gas turbine engines used to produce steam for one steam turbine engine, three gas turbine engines used to produce steam for two steam turbine engines, etc.

The various embodiments of the present invention are directed to a fuel gas heating system that utilizes a thermal storage unit along with an extracted portion of working fluid generated in the bottom cycle heat engine to heat fuel gas for use in an electrical power generation plant. In FIG. 1, fuel gas heating system 102 includes thermal storage unit 110 which stores a thermal storage working medium that is used in conjunction with the extracted portion of working fluid from the bottom cycle heat engine to heat fuel gas supplied to an inlet of combustor chamber 105. Thermal storage unit 110 can include a cold tank 156 containing the thermal storage working medium in a cold state and an insulated hot tank 158 containing the thermal storage working medium in a heated state. In one embodiment, the thermal storage working medium utilized by thermal energy storage unit 110 in cold tank 156 and hot tank 158 may comprise any one of a number of storage media of a type having the capacity to absorb, retain and then release thermal energy in any desired duty cycle. In addition, the thermal storage working medium should possess high heats of fusion, broad operative temperature ranges, and relative inertness. An illustrative, but non-exhaustive, list of a thermal storage working medium that can be utilized by thermal energy storage unit 110 includes an inorganic salt such as a molten salt, hot oil, pressurized water, etc. Those skilled in the art will appreciate that other chemical inorganic compounds can be used as the thermal storage working medium. For example, alkali metal hydroxides such as sodium hydroxide are types of inorganic compounds that can be used as the thermal storage working medium.

Fuel gas heating system 102 further includes an energy storage charge heat exchanger 160 (energy storage charge hx) that facilitates a heat transfer of thermal energy between a working fluid generated in HRSG 116 and the thermal storage working medium in cold tank 156 of thermal storage unit 110, and discharges the thermal storage working medium in a heated state into hot tank 158 of the thermal storage unit. In one embodiment, energy storage charge heat exchanger 160 is located within HRSG 116. Those skilled in the art will recognize that energy storage charge heat exchanger 160 can be located outside HRSG 116 and still serve as a heat exchanger to facilitate a heat transfer between a working fluid of the HRSG and the thermal storage working medium.

Generally, energy storage charge heat exchanger 160 facilitates the heat transfer of thermal energy between a working fluid from HRSG 116 and the thermal storage working medium in cold tank 156 during normal operation of electrical power plant generation 100 (e.g., at a base load). In this manner, energy storage charge heat exchanger 160 can discharge the thermal storage working medium in a heated state to hot tank 158. Fuel gas heating system 102 can then use the heated thermal storage working medium to heat fuel gas provided to combustor chamber 105 of gas turbine engine 104 during a startup such as, for example, a cold startup where the power plant is restarted after a sufficiently long period of time such that the temperatures of critical HRSG and steam turbine hardware have thermally decayed from baseload operating temperatures and approach ambient temperature. While firm guidelines of "cold startup" temperatures will vary, cold startups can typically be defined by steam turbine high pressure section metal temperatures below 200° F. to 400° F. (93° C. to 204° C.) prior to steam turbine acceleration. During a cold start the gas turbine engine typically comes online and goes to full-speed, 0% load and then to full-speed 100% load. Although the description that follows is directed to cold gas turbine engine startups, those skilled in the art will appreciate that embodiments of the present invention are also suitable for warm startups, or any other type of startup that is constrained by the need to attain certain fuel gas temperatures before proceeding through a sequence of various combustion modes. With regard to warm startups, while firm guidelines of "warm startup" temperatures will vary, the range would typically include steam turbine high pressure section metal temperatures above 200° F. to 400° F. (93° C. to 204° C.) but below 600° F. to 800° F. (316° C. to 427° C.) prior to steam turbine acceleration.

Continuing with the fuel gas heating system 102, a fuel gas heater 112 is configured to heat fuel gas supplied from a fuel gas source (depicted in FIG. 1 as fuel) to combustor chamber 105 of gas turbine engine 104. As shown in FIG. 1, an extracted portion of a working fluid from HRSG 116 is supplied to fuel gas heater 112. In one embodiment, the working fluid may be hot water extracted from IP economizer 144. Fuel gas heater 112, which may be a heat exchanger, can heat the fuel gas with the hot water to raise the temperature from the level that is provided by the fuel source. Although FIG. 1 shows hot water extracted from IP economizer 144 used to heat the fuel gas, it is possible that hot water can be extracted from HP economizer 136, LP economizer 149, or combinations of any of the multi-pressure economizers deployed in HRSG 116. Furthermore, working fluid could be extracted from condenser 120 and used by fuel gas heater 112 to heat the fuel gas. Generally, the selection of which economizers within HRSG 116 to extract the working fluid or other components within bottom cycle heat engine 106 will depend on the temperature of the fuel gas that is desired to attain during fuel gas heating. For example, if it was desirable to have fuel gas with a temperature at about 400 degrees Fahrenheit (F) (204 degrees Celsius (C)) at an outlet of fuel gas heater 112, then hot water from IP economizer 144, which can be around 430° F. (221° C.) for pressures in IP section 130, should be sufficient effectuate heating of the fuel gas by fuel gas heater 112 to about 400° F. (204° C.).

A cold-start fuel gas heater 114 is configured to complement fuel gas heater 112 in the heating of the fuel gas supplied from the fuel gas source. In the embodiment illustrated in FIG. 1, cold-start fuel gas heater 114 further heats the fuel gas generated from fuel gas heater 112. In particular, cold-start fuel gas heater 114 can utilize the thermal energy from the thermal storage working medium stored in hot tank 158 of thermal storage unit 110 to further facilitate heating of the fuel gas. By receiving the thermal storage working medium from hot tank 158, cold-start fuel gas heater 114 can facilitate a heat transfer of thermal energy between the thermal storage working medium and the fuel gas generated from fuel gas heater 112. This heating by cold-start fuel gas heater 114 will further raise the temperature of the fuel gas to a predetermined fuel gas temperature level that is higher than the temperature of the fuel gas at an outlet of fuel gas heater 112. Cold-start fuel gas heater 114 can then provide this heated fuel gas to combustor chamber 105 of gas turbine engine 104.

In this manner, fuel heating gas system 102 can effectuate a rapid heating of the fuel gas during a startup sequence of gas turbine engine 104. The rapid heating of the fuel gas in this manner would occur prior to conventional approaches that rely on sufficient warming of the HRSG working fluid to the typical required temperatures needed to heat the fuel gas. This enables gas turbine engine 104 to begin operating sooner in the startup sequence in a pre-mix combustion mode. As a result, gas turbine engine 104 can reach a higher, "emissions-compliant" load level more quickly since $NO_x$ emissions will be dramatically less when the fuel gas and air are mixed upstream of the combustor chamber 105 in a pre-mix combustion mode.

The thermal storage working medium that is used by cold-start fuel gas heater 114 to heat the fuel gas can then be distributed to cold tank 156 of thermal storage unit 110. Cold tank 156 can then supply the thermal storage working medium in a cold state to energy storage charge heat exchanger 160 for charging with a working fluid in HRSG 116. As mentioned above, this will facilitate a direct heat transfer of thermal energy between the working fluid supplied from HRSG 116 and the thermal storage working medium. A result of the heat transfer that occurs during this charging mode of operation is that the temperature of the thermal storage working medium is increased, producing a heated thermal storage working medium. The heated thermal storage working medium can then be stored in hot tank 158 and discharged during the next startup sequence. Note that in these charging and discharging modes of operation, HRSG 116 and its various components can supply the working fluid to steam turbine engine 118 in parallel or simultaneously while energy storage charge heat exchanger 160 facilitates the direct heat transfer of thermal energy between the working fluid and the thermal storage working medium. Furthermore, those skilled in the art will appreciate that the charging and discharging of the thermal storage working medium can occur at different locations than what is illustrated in FIG. 1 as well as in FIGS. 2-4.

During instances in which electrical power generation plant 100 has sequenced through the startup of gas turbine engine 104, thermal storage unit 110 can be in an off-mode where all of the exhaust energy from the gas turbine is applied to heat working fluid (e.g., water/steam) sent from HRSG 116 to steam turbine engine 118 for expansion work. In the thermal storage unit off mode, HRSG 116 is configured to supply all of the working fluid directly to steam turbine engine 118 without any heat transfer with the thermal storage working medium in thermal storage unit 110 via energy storage charge heat exchanger 160.

Figure 2:
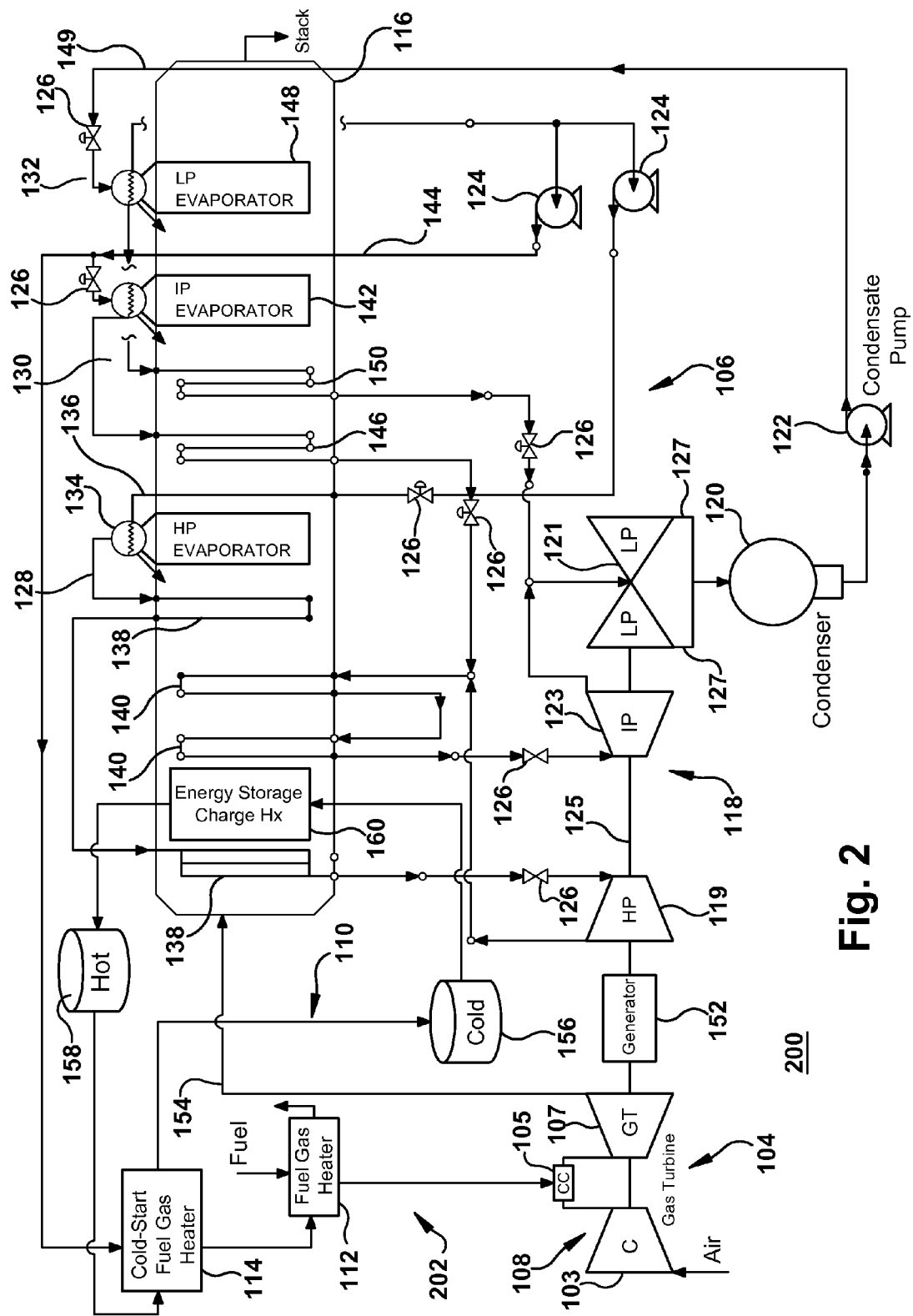
FIG. 2 is a schematic diagram of an electrical power generation plant having a fuel gas heating system according to a second embodiment of the present invention.

FIG. 2 shows a schematic diagram of an electrical power generation plant 200 having a fuel gas heating system 202 according to a second embodiment of the present invention. In the embodiment illustrated in FIG. 2, fuel gas heater 112 is juxtaposed with cold-start fuel gas heater 114, such that the function of the cold-start fuel heater changes from a "finishing" gas heater to a heat exchanger that warms up the portion of working fluid extracted from HRSG 116, while fuel gas heater 112 acts as the finishing gas heater. In FIG. 2, cold-start fuel gas heater 114 can heat up the portion of working fluid extracted from HRSG 116 to an increased temperature with the thermal storage working medium in hot tank 158 of thermal storage unit 110. In one embodiment, the working fluid applied to cold-start fuel gas heater 114 may be hot water extracted from IP economizer 144. Although FIG. 2 shows cold-start fuel gas heater 114 facilitating a heat transfer between the thermal storage working medium in hot tank 158 and hot water extracted from IP economizer 144, the cold-start fuel heater could use the thermal storage medium to heat up hot water extracted from HP economizer 136, LP economizer 149, or combinations of any of the multi-pressure economizers deployed in HRSG 116. Furthermore, cold-start fuel heater 114 could use the thermal storage medium to heat up working fluid extracted from condenser 120.

The thermal storage working medium that is used by cold-start fuel gas heater 114 to heat the extracted portion of working fluid from HRSG 116 can then be distributed to cold tank 156 of thermal storage unit 110. Cold tank 156 can then supply the thermal storage working medium in a cold state to energy storage charge heat exchanger 160 for subsequent charging with a working fluid in HRSG 116, for example, during base load operation of electrical power generation plant 200.

In fuel heating system 202, fuel gas heater 112 receives the heated extracted portion of working fluid from cold-start fuel gas heater 114 and facilitates a heat transfer of thermal energy with the fuel gas supplied from the fuel gas source. In this manner, fuel gas heater 112 can heat up the fuel gas with the working fluid extracted from HRSG 116 that has been warmed up by cold-start fuel gas heater 114. This heating by fuel gas heater 112 will raise the temperature of the fuel gas to a predetermined fuel gas temperature level that is required by the particular combustion mode that combustor chamber 105 is sequencing through in the startup of gas turbine engine 104. Upon reaching the predetermined fuel gas temperature level, fuel gas heater 112 can then provide the heated fuel gas to combustor chamber 105.

Those skilled in the art will appreciate that in the embodiment illustrated in FIG. 2, the temperature of the thermal storage working medium in hot tank 158 of thermal storage unit 110 should be at temperature level that is significantly higher than the predetermined temperature level that is needed by combustor chamber 105 to sequence through to the next combustion mode. This is necessary because cold-start fuel gas heater 114 is heating up the working fluid extracted from HRSG 116, which is used by gas fuel heater 112 to heat up the fuel gas supplied to combustor chamber 105. In some instances, HRSG 116 may be too cold during the startup to generate a working fluid with a sufficient temperature to facilitate effective heating of the fuel gas for the required temperatures. Keeping the thermal storage working medium in hot tank 158 at a sufficiently high enough temperature will obviate these concerns. For example, if it was desired to have fuel gas supplied to the inlet of combustor chamber 105 at 400° F. (204° C.), then the working fluid extracted from HRSG 116 that is used to heat the fuel gas should presumably have a temperature around 430° F. (221° C.). Storing the thermal storage working medium such as, for example, molten salt, in hot tank 158 at a temperature that ranges from about 460° F. (238° C.) to about 480° F. (249° C.) will ensure that the extracted working fluid reaches a temperature of around 430° F. (221° C.). This enables fuel gas heater 112 to heat the fuel gas to the predetermined fuel gas temperature required by combustor chamber 105.

Figure 3:
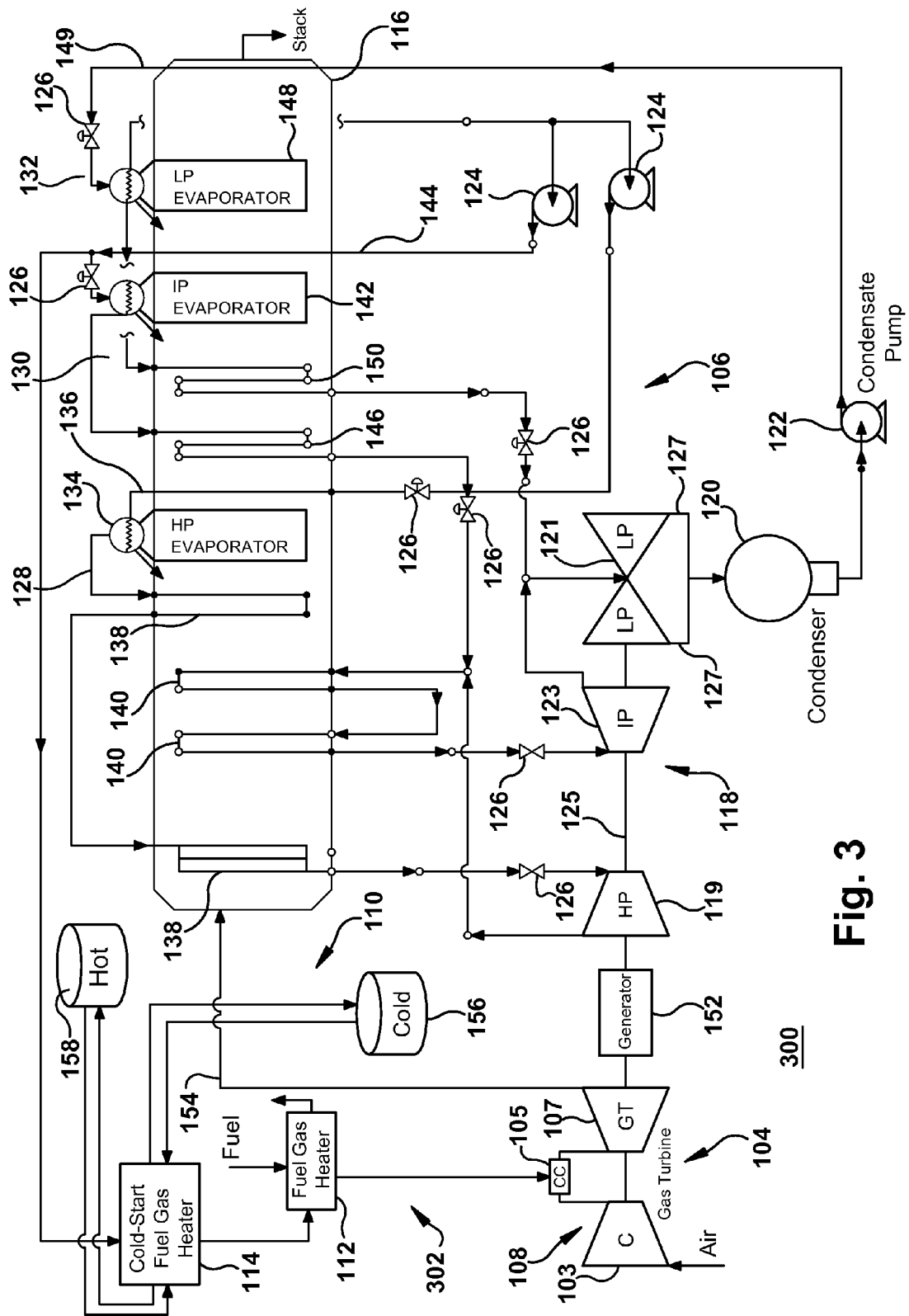
FIG. 3 is a schematic diagram of an electrical power generation plant having a fuel gas heating system according to a third embodiment of the present invention.

FIG. 3 shows a schematic diagram of an electrical power generation plant 300 having a fuel gas heating system 302 according to a third embodiment of the present invention. In the embodiment illustrated in FIG. 3, fuel gas heater 112 and cold-start fuel gas heater 114 are in the same positions as illustrated in FIG. 2. However, in this embodiment, the energy storage charge heat exchanger 160 has been removed. In FIG. 3, cold-start fuel gas heater 114 can heat up the portion of working fluid extracted from HRSG 116 to an increased temperature with the thermal storage working medium in hot tank 158 of thermal storage unit 110. In one embodiment, the working fluid applied to cold-start fuel gas heater 114 may be hot water extracted from IP economizer 144. Although FIG. 3 shows cold-start fuel gas heater 114 facilitating a heat transfer between the thermal storage working medium in hot tank 158 and hot water extracted from IP economizer 144, the cold-start fuel heater could use the thermal storage medium to heat up hot water extracted from HP economizer 136, LP economizer 149, or combinations of any of the multi-pressure economizers deployed in HRSG 116. Furthermore, cold-start fuel heater 114 could use the thermal storage medium to heat up working fluid extracted from condenser 120.

The thermal storage working medium that is used by cold-start fuel gas heater 114 to heat the extracted portion of working fluid from HRSG 116 can then be distributed to cold tank 156 of thermal storage unit 110. During a baseload operating condition, the cold tank 156 can then supply the thermal storage working medium in a cold state back to cold-start fuel gas heater 114 for subsequent charging with the working fluid extracted from HRSG 116. Upon charging the thermal storage working medium, cold-start fuel gas heater 114 can then place the heated thermal storage working medium in hot tank 158. Thermal storage unit 110 can then discharge the thermal storage working medium in the heated state from hot tank 158 to cold-start fuel gas heater 114 for warming up the working fluid from HRSG 116 during the next startup sequence in which a constrained temperature is needed by combustor chamber 105.

As in FIG. 2, fuel heating system 302 configures fuel gas heater 112 to receive the heated extracted portion of working fluid from cold-start fuel gas heater 114 and facilitates a heat transfer of thermal energy with the fuel gas supplied from the fuel gas source. In this manner, fuel gas heater 112 can heat up the fuel gas with the working fluid extracted from HRSG 116 that has been warmed up by cold-start fuel gas heater 114. This heating by fuel gas heater 112 will raise the temperature of the fuel gas to a predetermined fuel gas temperature level that is required by the particular combustion mode that combustor chamber 105 is sequencing through in the startup of gas turbine engine 104. Upon reaching the predetermined fuel gas temperature level, fuel gas heater 112 can then provide the heated fuel gas to combustor chamber 105.

Those skilled in the art will appreciate that in the embodiment illustrated in FIG. 3, the temperature of the thermal storage working medium in hot tank 158 of thermal storage unit 110 can never be hotter than the hottest water that is available in HRSG 116. This is due to using cold-start fuel gas heater 114 to charge up the thermal storage working medium with the working fluid (e.g., hot water) from HRSG 116. As a result, it may be necessary to ensure that the thermal storage working medium is not charged up too quickly with the working fluid extracted from HRSG 116. If the thermal storage working medium is charged up too quickly, then the temperature of the heated working fluid generated from cold-start fuel gas heater 114 may drop considerably upon recharging. This makes it harder for fuel gas heater 112 to provide a heated fuel gas to combustor chamber 105 that satisfies predetermined fuel gas requirements for certain combustion modes. As result, the thermal storage working medium should be charged up by cold-start fuel gas heater 114 at a relatively slow rate in order to sustain the ability of fuel gas heating system 302 to rapidly heat fuel gas in a startup cycle in order to attain an emissions compliant load level.

Figure 4:
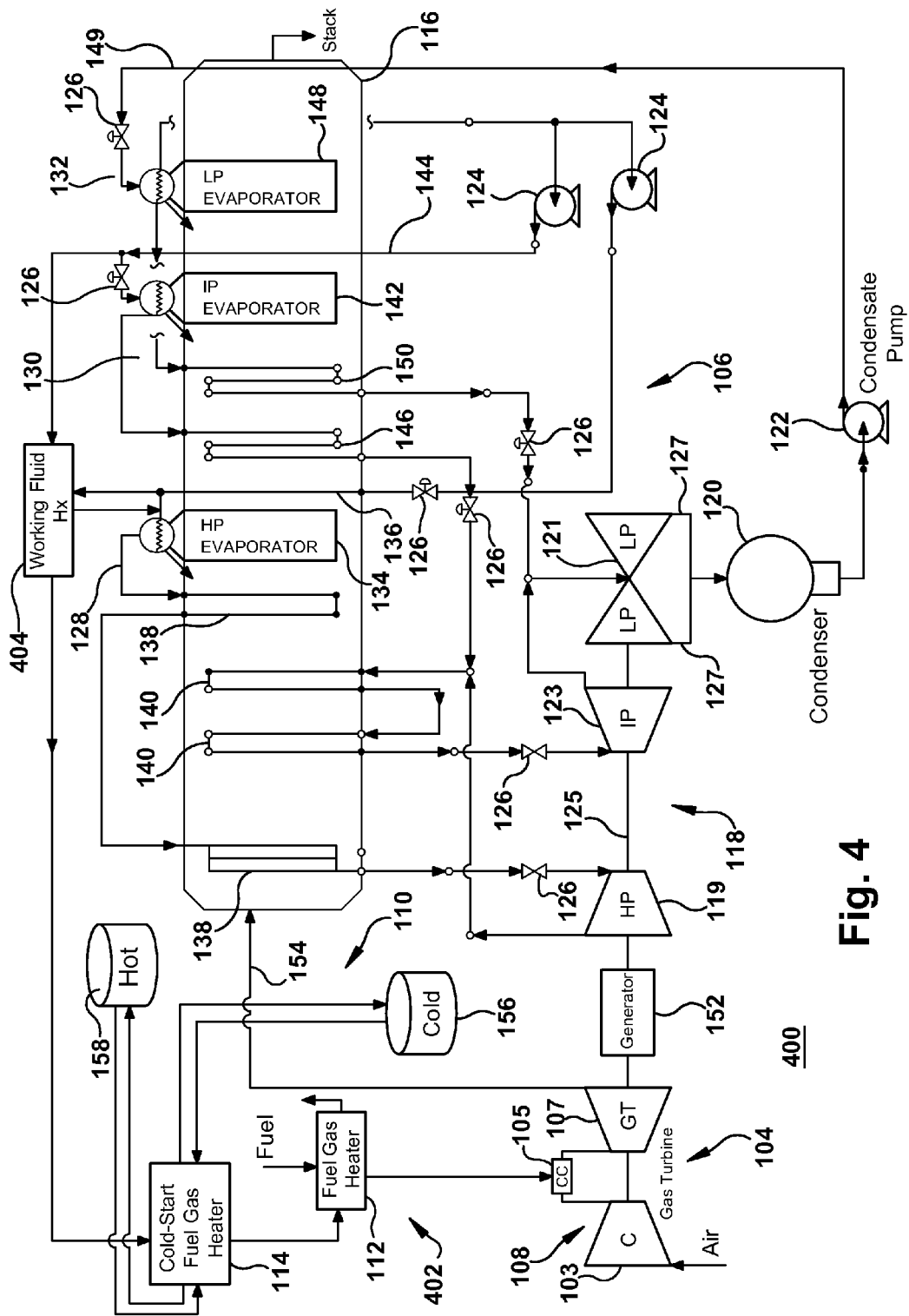
FIG. 4 is a schematic diagram of an electrical power generation plant having a fuel gas heating system according to a fourth embodiment of the present invention.

FIG. 4 shows a schematic diagram of an electrical power generation plant 400 having a fuel gas heating system 402 according to a fourth embodiment of the present invention. In particular, fuel gas heating system 402 provides a configuration that obviates the concern associated with charging the thermal storage working medium in fuel heating system 302. As shown in FIG. 4, a working fluid heat exchanger 404 (Working Fluid Hx) is utilized to facilitate prompt charging of the thermal storage working medium. Working fluid heat exchanger 404, which is essentially a water-to-water heat exchanger, can facilitate a heat transfer between portions of the working fluid extracted from at least two different pressure sections in HRSG 116. Working fluid heat exchanger 404 can then supply this heated working fluid as the extracted fluid from HRSG 116 to cold-start fuel gas heater 114.

As shown in FIG. 4, working fluid heat exchanger 404 can facilitate a heat transfer between heated water taken from IP economizer 144 and heated water taken from HP economizer 136. In this embodiment, the heated water taken from HP economizer 136 can be used to heat up the water taken from IP economizer 144. This allows the water from IP economizer 144 to heat up to a temperature level that cold-start fuel gas heater 114 can use to promptly heat up the thermal storage working medium. This will sustain the ability of fuel gas heating system 402 to provide fuel gas temperatures that satisfy combustor chamber 105 requirements associated with each of the combustion modes that are sequenced through in the gas turbine engine startup. For example, if the water temperature at IP economizer 144 is at around 430° F. (221° C.) for about 800 PSI, and the water temperature at HP economizer 136 ranges from about 550° F. (288° C.) to about 600° F. (316° C.), then working fluid heat exchanger 404 can facilitate a heat transfer upon the water of IP economizer 144 that causes it temperature to rise to about 500° F. (260° C.). This heated water can then be supplied from working fluid heat exchanger 404 to cold-start fuel gas heater 114. This temperature level of the extracted portion of working fluid from HRSG 116 is more than enough to enable cold-start fuel gas heater 114 and fuel gas heater 112 to provide a heated fuel gas that meets predetermined fuel gas temperature levels. With this embodiment, there is no longer a concern in how hot the thermal storage working medium needs to be in order to account for its charging by the portion of working fluid extracted from HRSG 116, as with the embodiment illustrated in FIG. 3. The only limitation in this embodiment would be the temperature of the hot water provided by HP economizer 136. However, the hot water provide by an HP economizer in a common HRSG would typically be sufficient enough to rapidly charge the thermal storage working medium to temperature levels that meet the requirements of a combustor chamber to effectuate operation at an emissions compliant load level.

Although FIG. 4 shows working fluid heat exchanger 404 facilitating a heat transfer between hot water taken from IP economizer 144 and heated water taken from HP economizer 136, the working fluid heat exchanger could use hot water extracted from any combination of HP economizer 136, IP economizer 144 or LP economizer 149. These combinations of hot water taken from the economizers could also be combined with other components from within bottom cycle heat engine 106 such as condenser 120.

As described herein, the various embodiments of the present invention enable a more rapid heating of fuel gas sooner in the startup sequence of a gas turbine engine that operates within an electrical power generation plant. This translates to the gas turbine engine reaching an "emissions-compliant" load level more quickly. This results in fewer emissions during gas turbine engine startup. Reduced emissions during gas turbine engine startup will lessen the total emissions from the power plant.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," and "having," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system, comprising:
a gas turbine engine;
a steam generating source configured to recover exhaust energy from the gas turbine and generate a supply of a working fluid;
a fuel gas source configured to supply fuel gas to the gas turbine engine;
a thermal storage unit configured to store a thermal storage working medium for heating the fuel gas supplied from the fuel gas source to the gas turbine, the thermal storage unit including a cold tank storing the thermal storage working medium in a cold state and a hot tank storing the thermal storage working medium in a heated state, wherein the thermal storage working medium is separate and different from the working fluid;
a first fuel gas heater configured to heat the fuel gas supplied from the fuel gas source; and
a second fuel gas heater configured to complement the first fuel gas heater in the heating of the fuel gas supplied from the fuel gas source, wherein the first fuel gas heater and the second fuel gas heater utilize an extracted portion of the working fluid generated in the steam generating source and thermal energy from the thermal storage working medium stored in the hot tank of the thermal storage unit to heat the fuel gas to a predetermined fuel gas temperature level.

2. The system according to claim 1, wherein the first fuel gas heater is configured to heat the fuel gas supplied from the fuel gas source and the second fuel gas heater is configured to further heat the fuel gas generated from the first fuel gas heater, wherein the second fuel gas heater receives the thermal storage working medium from the hot tank of the thermal storage unit and facilitates a heat transfer of thermal energy between the thermal storage working medium and the fuel gas generated from the first fuel gas heater to increase the temperature of the fuel gas to the predetermined fuel gas temperature level.

3. The system according to claim 2, wherein the steam generating source includes an energy storage charge heat exchanger that facilitates a heat transfer of thermal energy between the working fluid generated in the steam generating source and the thermal storage working medium in the cold tank of the thermal storage unit and discharges the thermal storage working medium in a heated state into the hot tank of the thermal storage unit.

4. The system according to claim 2, wherein the steam generating source is configured to supply the extracted portion of the working fluid generated therein to the first fuel gas heater, the first fuel gas heater configured to facilitate a heat transfer of thermal energy between the extracted portion of the working fluid and the fuel gas to increase the temperature of the fuel gas supplied from the fuel gas source.

5. The system according to claim 2, wherein the steam generating source comprises a multi-pressure heat recovery steam generation unit including a high pressure section, an intermediate pressure section and a low pressure section, wherein the high pressure section, the intermediate pressure section and the low pressure section each includes a superheater, an evaporator and an economizer.

6. The system according to claim 5, wherein an economizer from at least one of the pressure sections in the multi-pressure heat recovery steam generation unit is configured to supply the extracted portion of the working fluid generated therein to the first fuel gas heater, the first fuel gas heater configured to facilitate a heat transfer of thermal energy between the extracted portion of the working fluid and the fuel gas to increase the temperature of the fuel gas.

7. The system according to claim 2, wherein the second fuel gas heater is configured to provide the fuel gas heated to the predetermined fuel gas temperature level to a combustor chamber of the gas turbine engine.

8. The system according to claim 1, wherein the second fuel gas heater is configured to heat up the extracted portion of the working fluid generated in the steam generating source with the thermal storage working medium in the hot tank of the thermal storage unit, the first fuel gas heater receiving the heated extracted portion of the working fluid from the second fuel gas heater and facilitating a heat transfer of thermal energy with the fuel gas supplied from the fuel gas source.

9. The system according to claim 8, wherein the second fuel gas heater is configured to receive the thermal storage working medium from the hot tank of the thermal storage unit and facilitate a heat transfer of thermal energy between the thermal storage working medium and the extracted portion of the working fluid to increase the temperature of the extracted portion of the working fluid before being supplied to the first fuel gas heater.

10. The system according to claim 9, wherein the second fuel gas heater is configured to supply the thermal storage medium after the heat transfer thereof with the extracted portion of the working fluid to the cold tank of the thermal storage unit for storage.

11. The system according to claim 8, wherein the steam generating source includes an energy storage charge heat exchanger that transfers thermal energy between the working fluid generated in the steam generating source and the thermal storage working medium in the cold tank of the thermal storage unit and discharges the thermal storage working medium in a heated state into the hot tank of the thermal storage unit.

12. The system according to claim 8, wherein the steam generating source comprises a multi-pressure heat recovery steam generation unit including a high pressure section, an intermediate pressure section and a low pressure section, wherein the high pressure section, the intermediate pressure section and the low pressure section each includes a superheater, an evaporator and an economizer.

13. The system according to claim 12, wherein an economizer from at least one of the pressure sections in the heat recovery steam generation unit is configured to supply the extracted portion of the working fluid to the second fuel gas heater, the second fuel gas heater facilitating a heat transfer of thermal energy between the thermal storage working medium and the extracted portion of the working fluid to increase the temperature of the extracted portion of the working fluid.

14. The system according to claim 8, wherein the second fuel gas heater is configured to receive the thermal storage medium stored in the cold tank of the thermal storage unit and charge the thermal storage medium to a heated state with the extracted portion of the working fluid generated in the steam generating source, the second fuel gas heater discharging the thermal storage medium in the heated state to the hot tank of the thermal storage unit for storage.

15. The system according to claim 8, further comprising a working fluid heat exchanger that facilitates a heat transfer between portions of the working fluid extracted from at least two different pressure sections in the steam generating source resulting in the extracted portion of the working fluid generated from the steam generating source, the working fluid heat exchanger configured to supply the extracted portion of the working fluid to the second fuel gas heater.

16. The system according to claim 15, wherein the steam generating source comprises a multi-pressure heat recovery steam generation unit including a high pressure section, an intermediate pressure section and a low pressure section, wherein the high pressure section, the intermediate pressure section and the low pressure section each includes a superheater, an evaporator and an economizer.

17. The system according to claim 16, wherein the working fluid heat exchanger facilitates a heat transfer between portions of the working fluid generated from the economizers of at least two of the pressure sections in the steam generating source.

18. The system according to claim 8, wherein the first fuel gas heater is configured to provide the fuel gas heated to the predetermined fuel gas temperature level to a combustor chamber of the gas turbine engine.

19. The system according to claim 1, further comprising a steam turbine engine configured to receive the supply of the working fluid from the steam generating source.

20. The system according to claim 1, wherein the thermal storage working medium comprises an inorganic salt.

* * * * *